2 Sheets—Sheet 1.

S. D. LOCKE.

Grain-Binder.

No. 9,015. Reissued Dec. 30, 1879.

Attest:
H. D. Perrine.
Danl. Kelly

Inventor.
Sylvanus D. Locke
By Pennington & Parsons
Attorneys

S. D. LOCKE.

Grain-Binder.

No. 9,015. Reissued Dec. 30, 1879.

Attest:
H. L. Perine
Danl. Kelly

Inventor:
Sylvanus D. Locke
By Poole & Dangerfield
Attorney's

UNITED STATES PATENT OFFICE.

SYLVANUS D. LOCKE, OF HOOSICK FALLS, NEW YORK.

IMPROVEMENT IN GRAIN-BINDERS.

Specification forming part of Letters Patent No. 56,580, dated July 24, 1866; Reissue No. 9,015, dated December 30, 1879; application filed December 2, 1879.

DIVISION B.

*To all whom it may concern:*

Be it known that I, SYLVANUS D. LOCKE, formerly of the city of Janesville, county of Rock, and State of Wisconsin, but now of Hoosick Falls, in the county of Rensselaer and State of New York, have invented certain new and useful Improvements in Machines for Binding Grain, of which the following is a specification.

My invention relates to clutch-couplings for use with automatic grain-binding mechanism to bring the machine to a full stop at the end of any complete revolution of the shaft by which it is driven, capable also of general application where a like effect is desired; and it consists in combining with the clutch means for automatically disengaging or unshipping it as the shaft completes its revolution to stop the machine, and likewise means for causing its re-engagement when it is desirable to start the machine, as hereinafter described and claimed.

Figure 1:
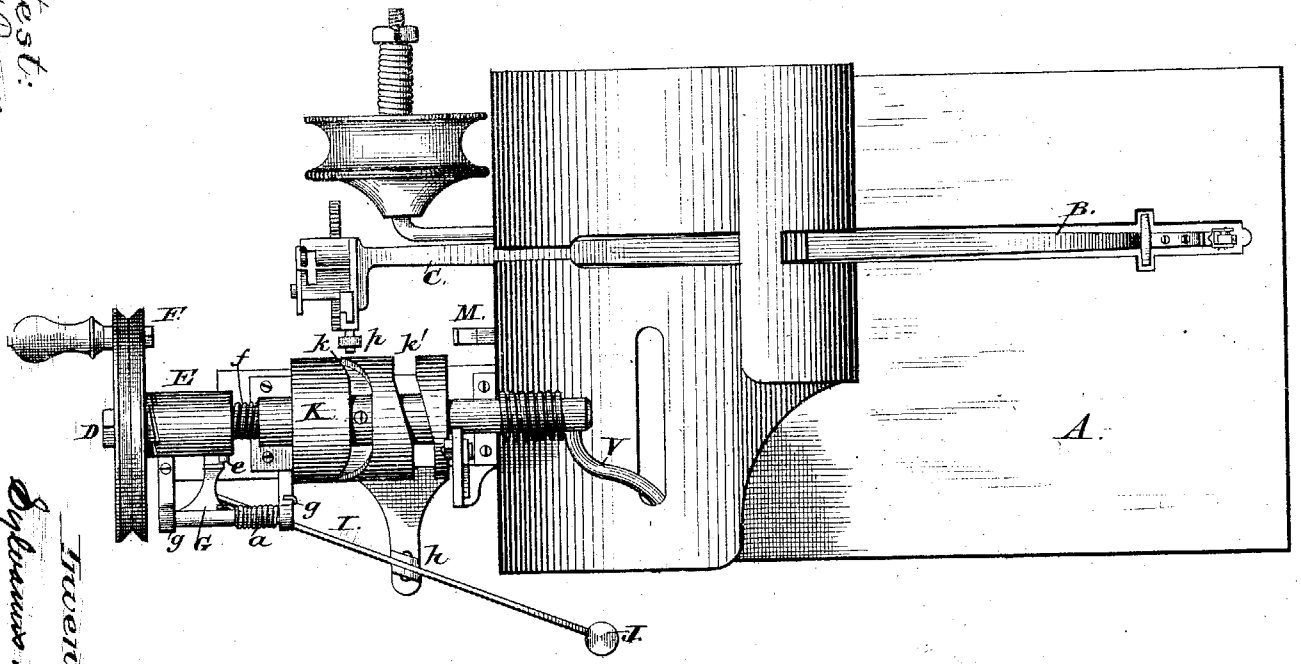
Figure 2:
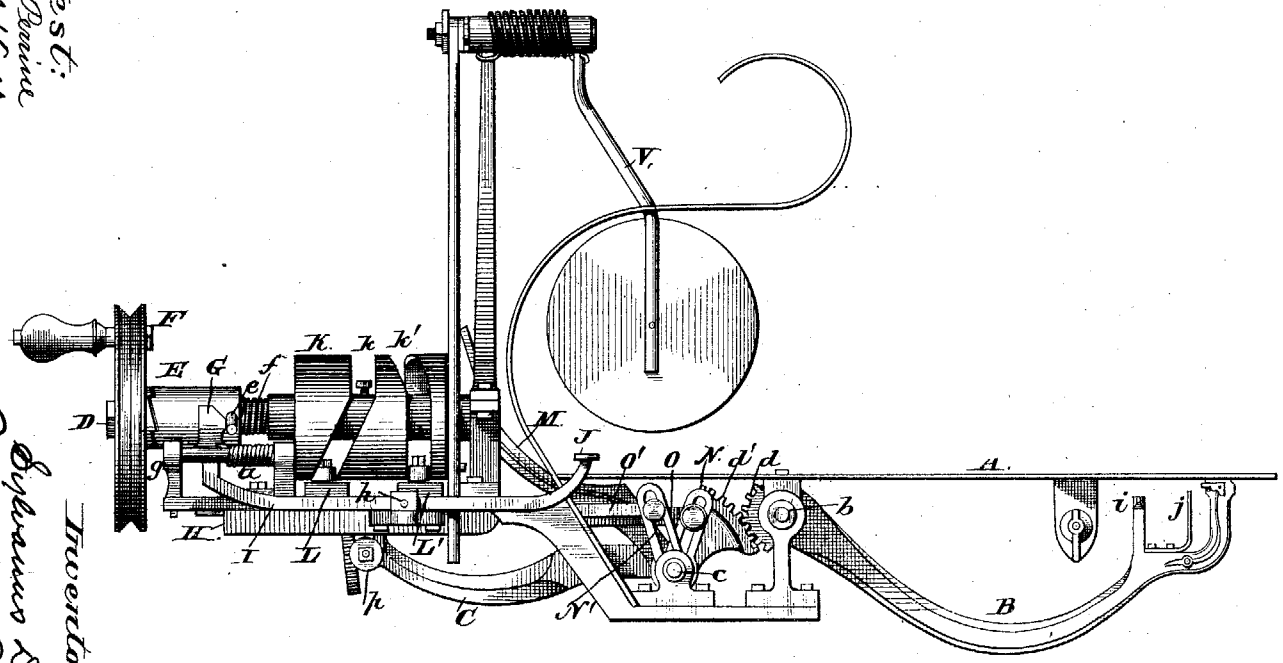

In the drawings, Figure 1 is a plan view of a machine embodying my improvements. Fig. 2 is a side elevation thereof.

A is a grain table or receptacle, intended to receive grain from the harvester through the means of either automatic or hand raking apparatus. B is the band-carrying arm, and C the arm which carries the binding-head. D is the driving-shaft; E, a clutch, and F a driving-wheel, which runs loosely upon the shaft when the clutch is disengaged therefrom. Upon the clutch-sleeve or sliding part is a pin, *e*, and normally resting against said sleeve is an arm, G, pivoted in the lugs *g g* on the frame-work or bed-piece H, so that its axis is parallel with the shaft and sleeve, and having an inclined face or edge, against which the pin *e* comes once in each revolution of the shaft, throwing the clutch out of engagement and bringing the machine to a stop. Beneath this pivoted arm lies one end of the lever I, which has its pivot or fulcrum in the lug or projection *h* on the frame-work or bed-piece, and terminates at the other end in a foot-piece, J, for the attendant. When this lever is depressed the pivoted disengaging-arm is raised up out of contact with the pin *e*, so as to permit the spring *f* to throw the clutch into engagement with its counterpart upon the driving-wheel, and when the lever is released the arm is carried back to place upon the periphery of the clutch-sleeve by means of a spring, *a*, upon its pivot, or of its own weight, so that in the ensuing revolution of the shaft it will be in position to perform again the same operation of disengaging the clutch.

I have shown the clutch as a one-way clutch—that is, as so constructed that it is engaged only when the harvesting-machine is moving forward, and passes automatically out of engagement when the harvesting-machine is moving backward, being formed for this purpose with ratchet-teeth arranged so that when the driving-wheel is revolved in the proper direction the perpendicular faces of the teeth engage and drive the shaft; but when its action is reversed the inclined faces ride up and slip past each other, overcoming the stress of the spring. By this means the harvester or reaper is permitted to back without actuating the binding-machine or affecting the process of binding.

K is a cam-cylinder, secured to the driving-shaft and having cam-grooves *k k'*, which operate the cam-slides L L'. Each slide is formed with a projection or anti-friction roll to take into its respective groove in the cylinder. The slide L reciprocates in a planed way in the frame or bed-piece H, and within this slide is formed a way for the slide L'. Their upper faces are flush with the surface of the bed-piece, and they are held in place therein by the feet of the standards which support the driving-shaft.

The arms which carry the band and binding-head are pivoted, respectively, at *b* and at *c*, and engage with each other by means of segmental gears *d d'*, so that the movement of one actuates the other, bringing them together for the binding operation, and throwing them apart as it is completed.

Near to the arm C, and vibrating upon the same axis by means of a sleeved hub, is an arm, M, intended to operate a sliding rack in the binding-head carried by the former. Upon the shaft of the arm C is a crank, N, and upon the hub of the arm M a crank, N'. These are operated, respectively, from the cam-slides L and L′ by means of connecting-arms or pitmen O O′.

The binding-head shown in connection with this machine forms the subject of Letters Patent No. 60,208, granted me December 4, 1866, and will be found fully described therein. A description of this and of the remaining parts of the machine is unnecessary herein to illustrate the action of the clutch mechanism.

To operate the machine it is necessary to attach it to a harvester, so as to receive the unbound gavel either sidewise or lengthwise, according to the style of the harvester, and to apply power either by hand or from the harvester to the driving-wheel F. The wire having been run from the reel to the binding-head, the grain to be bound is to be raked onto the binding-platform or grain-receptacle either by hand or by a self-raker. When a sufficient quantity has been there deposited the attendant places his foot upon the foot-piece J on the end of the lever I, and, depressing it, raises the disengaging-arm, which has until this moment held the binder out of gear from contact with the pin upon the clutch-sleeve, whereupon the clutch is forced by its spring into engagement with its counterpart upon the driving-wheel, and the binding machinery is set in motion.

The cam-groove *k* in the cam-cylinder first moves the slide L, which, by means of the connecting-arm or pitman O and crank N, causes the arms B C to rise and approach each other. As the heads of the arm come together the wire draws the grain that is to form the sheaf or bundle into and against the circular part or shield of the grain-receptacle. The wire is pressed into place in the binding-head by the stationary finger *i* and adjustable finger *j* of the band-carrying arm. The binding-head and band-carrying arms having come fully together, the cam-groove K, which before was inclined to move their slide outward, now becomes circumferential to hold the slide and arms at rest. In this position the roller *p* on the end of the sliding rack in the binding-head is beneath and in proximity to or contact with the end of the vibrating arm M, and the cam-slide L′, with which the latter is connected by its crank N′ and pitman O′, is just entering the inclined portion of its cam-groove *k′*, which forces it inward toward the driving-wheel, so as to bring down the vibrating arm, and this, in its turn, presses down the roller and its rack, giving motion to the gearing in the binding-head, and causing the wire to be twisted and cut. The arms B C are then retracted from each other by reason of their slide having entered the return-incline of the groove *k*. The vibrating arm M is also returned to its first position by its cam, the ejecting-arm V is operated by a projection on the cam-cylinder to discharge the bound sheaf, and, finally, the lever having been released and the disengaging-arm being in contact with the periphery of the clutch, the latter is automatically disengaged and the binder comes to rest, with its various combinations in their original position, ready to receive a fresh gavel.

The next movement of the binder will, as before, be determined by the depression of the lever by the attendant upon the accumulation of a sufficient quantity of grain, the machine being thus worked to its full capacity, or substantially so, in each binding operation, and being in action in the aggregate only during the minimum of time necessary to the binding of the crop.

I claim as my invention—

1. In combination with a sliding clutch, a cam-arm vibrating upon a pivot parallel thereto, resting upon the periphery thereof and engaging with a projection upon said clutch as it revolves to force it out of engagement, and a lever to raise and hold the cam-arm out of the path of the projection to permit engagement.

2. The combination of the sliding clutch, its projection, the cam-arm vibrating upon a pivot parallel to the clutch, the spring pressing the arm against the clutch, and the foot-lever or equivalent device to raise or disengage said arm.

SYLVANUS D. LOCKE.

Witnesses:

CHAS. A. BROWN,

WM. M. ARCHIBALD.